(12) United States Patent
Wang (10) Patent No.: US 8,982,187 B2
(45) Date of Patent: Mar. 17, 2015

(54) SYSTEM AND METHOD OF RENDERING STEREOSCOPIC IMAGES

(75) Inventor: Tzung-Ren Wang, Tainan (TW)

(73) Assignee: Himax Technologies Limited (TW)

( * ) Notice: Subject to any disclaimer, the term of this patent is extended or adjusted under 35 U.S.C. 154(b) by 755 days.

(21) Appl. No.: 13/236,142

(22) Filed: Sep. 19, 2011

(65) Prior Publication Data

US 2013/0069934 A1    Mar. 21, 2013

(51) Int. Cl.
*H04N 13/02*    (2006.01)
*H04N 1/00*    (2006.01)
*H04N 13/00*    (2006.01)

(52) U.S. Cl.
CPC ........... *H04N 1/007* (2013.01); *H04N 13/0022* (2013.01)
USPC ..................... 348/46; 348/51; 348/43; 348/42

(58) Field of Classification Search
USPC .......................................... 348/46, 51, 43, 42
See application file for complete search history.

(56) References Cited

U.S. PATENT DOCUMENTS

| | | | |
|---|---|---|---|
| 6,791,598 B1 * | 9/2004 | Luken et al. | 348/36 |
| 8,553,997 B1 * | 10/2013 | Hernandez Esteban | 382/232 |
| 8,848,038 B2 * | 9/2014 | Yang et al. | 348/43 |
| 2011/0026808 A1 * | 2/2011 | Kim et al. | 382/154 |
| 2011/0115880 A1 * | 5/2011 | Yoo et al. | 348/42 |
| 2012/0099836 A1 * | 4/2012 | Welsh et al. | 386/230 |

* cited by examiner

*Primary Examiner* — Shawn An
(74) *Attorney, Agent, or Firm* — David I. Roche; Baker & McKenzie LLP (57) ABSTRACT

In some embodiments, a method of rendering a stereoscopic image based on a two-dimensional image frame and a depth map comprises generating a saliency map of the two-dimensional image frame, determining a region where is located an object of focus from the saliency map, modifying the depth map such that a range of depth values in the depth map that is associated the object of focus is redistributed toward a depth level of a display screen, and generating a virtual stereoscopic image frame based on the modified depth map and the two-dimensional image frame. In other embodiments, systems of rendering stereoscopic images are also described.

19 Claims, 7 Drawing Sheets

SYSTEM AND METHOD OF RENDERING STEREOSCOPIC IMAGES

BACKGROUND

1. Field of the Invention

The present invention relates to systems and methods of rendering stereoscopic images, and more particularly to stereoscopic rendering systems and methods that can reduce discomfort caused by decoupling between eye accommodation and vergence.

2. Description of the Related Art

For increased realism, three-dimensional (3D) stereoscopic image technology is increasingly applied in various fields such as broadcasting, gaming, animation, virtual reality, etc. To create depth perception, two image frames are typically captured or generated to simulate the left eye view and right eye view. These two image frames can be respectively provided to the left and right eyes on a two-dimensional screen so that each of the left and right eyes can only see the image associated therewith. The brain can then recombine these two different images to produce the depth perception.

One known technique for rendering stereoscopic image frames includes using a two-dimensional (2D) image and a depth map to construct a plurality of virtual stereoscopic image frames associated with the left and right eyes. Assume that a rendered object is meant to appear in front of (or behind) the display screen, the left and right eyes turn to respectively look at the left-eye and right-eye images of the object as if the object exists in front of (or behind) the display screen. However, the images of the object are actually presented at a fixed focal distance on the display screen. This results in decoupling of eye accommodation and vergence, which can cause difficulty in merging binocular images, and fatigue and discomfort.

Therefore, there is a need for an improved system that can reduce fatigue induced by vergence-accommodation conflict in stereoscopic image rendering.

SUMMARY

The present application describes systems and methods of rendering stereoscopic images. In some embodiments, the present application provides a method applicable on a processing unit to form a stereoscopic image based on a two-dimensional image frame and a depth map associated therewith. The method comprises generating a saliency map of the two-dimensional image frame, determining a region where is located an object of focus from the saliency map, modifying the depth map such that a range of depth values in the depth map that is associated the object of focus is redistributed toward a depth level of a display screen, and generating a virtual stereoscopic image frame based on the modified depth map and the two-dimensional image frame.

In other embodiments, the present application provides a stereoscopic rendering system. The system can comprise a memory, and a processing unit coupled with the memory, the processing unit being configured to generate a saliency map of the two-dimensional image frame, determine a region where is located an object of focus from the saliency map, modify the depth map such that a range of depth values in the depth map that is associated with the object of focus is redistributed toward a depth level of a display screen, and generate a virtual stereoscopic image frame based on the modified depth map and the two-dimensional image frame.

In addition, the present application also provides embodiments in which a computer readable medium comprises a sequence of program instructions which, when executed by a processing unit, causes the processing unit to generate a saliency map of the two-dimensional image frame, determine a region where is located an object of focus from the saliency map, modify the depth map such that a range of depth values in the depth map that is associated with the object of focus is redistributed toward a depth level of a display screen, and generate a virtual stereoscopic image frame based on the modified depth map and the two-dimensional image frame.

The foregoing is a summary and shall not be construed to limit the scope of the claims. The operations and structures disclosed herein may be implemented in a number of ways, and such changes and modifications may be made without departing from this invention and its broader aspects. Other aspects, inventive features, and advantages of the invention, as defined solely by the claims, are described in the non-limiting detailed description set forth below.

DETAILED DESCRIPTION OF EMBODIMENTS

Figure 1:
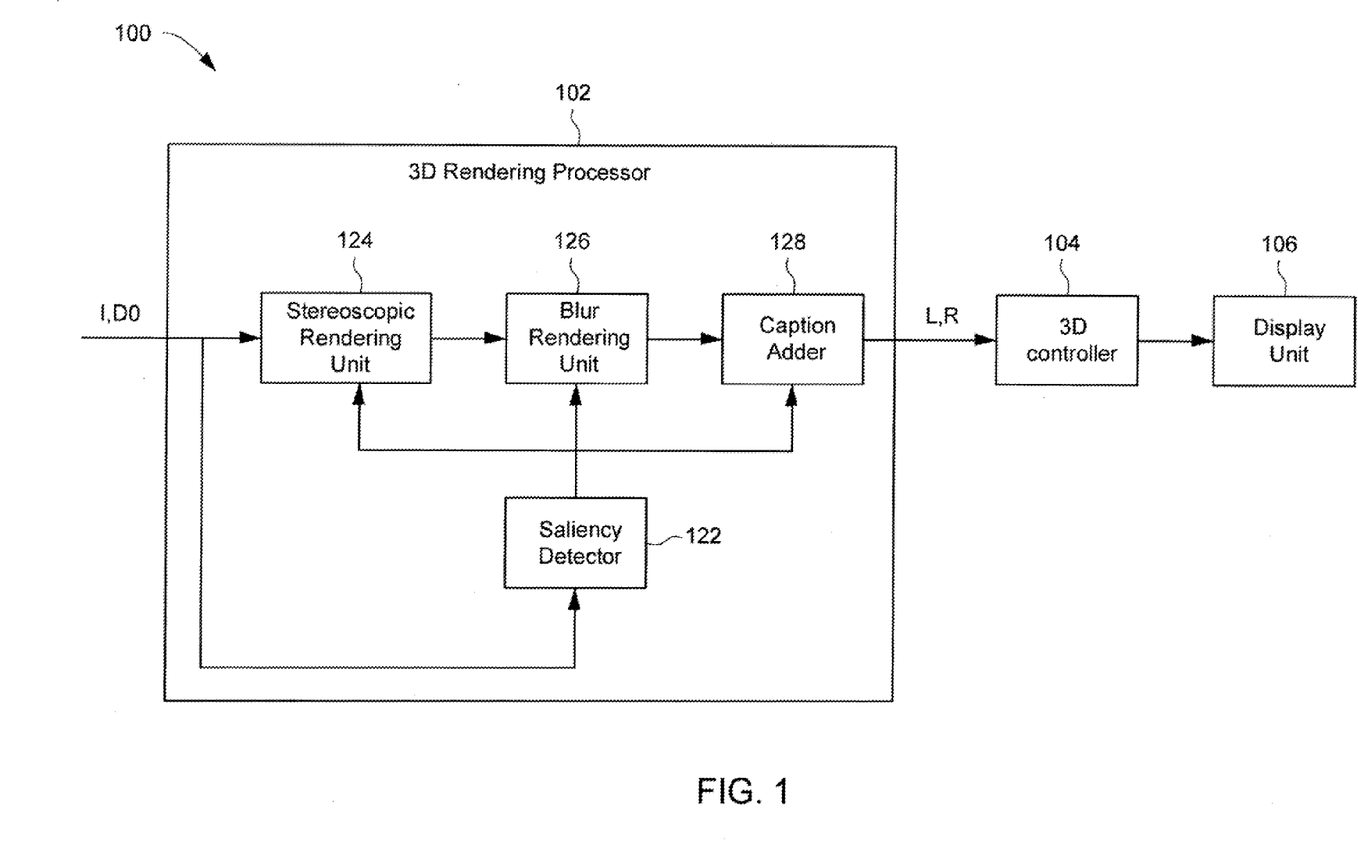
FIG. 1 is a simplified block diagram illustrating one embodiment of a 3D display system.

FIG. 1 is a simplified block diagram illustrating one embodiment of a stereoscopic rendering system 100. The stereoscopic rendering system 100 can be configured to generate a plurality of views that correspond to different perspectives of a same scene such that a viewer watching these different views with binocular vision can see an image with depth perception. Examples of the stereoscopic rendering systems 100 can include home television apparatuses, computer devices, tablet computers, mobile phones, smartphones, etc. In the illustrated example, the stereoscopic rendering system 100 can comprise a 3D rendering processor 102, a 3D controller 104 and a display unit 106.

The 3D rendering processor 102 can receive a two-dimensional (2D) image frame I and a depth map D0 from a data source, generate two or more images with different views based on the 2D image frame I and depth map D0, and output one or more stereoscopic pairs of image frames L, R corresponding to left and right eye views to the 3D controller 104.

The 3D controller 104 can transform the stereoscopic pairs of image frames L, R into a 3D format corresponding to the display unit 106 so that they can be presented on the display unit 106. In auto-stereoscopic/glassless display applications, the 3D controller 104 may also distribute multiple stereoscopic image frames L, R in a plurality of groups of views repeatedly offset across the display unit 106, each group of views being associated with a specific position of a viewer relative to a screen of the display unit 106. In this manner, the viewer may be able to watch a stereoscopic image from different positions relative to the display unit 106.

Referring again to FIG. 1, one embodiment of the 3D rendering processor 102 can include a saliency detector 122, a stereoscopic rendering unit 124, a blur rendering unit 126 and a caption/subtitle adder unit 128. The saliency detector 122 can receive the 2D image frame I and the depth map D0 associated therewith, and generate a saliency map that identifies certain salient features from the 2D image frame I corresponding to one or more object of focus to the viewer. The saliency detector 122 can also determine a range of depth values $R_Z$ in the depth map DO that is associated with the identified object of focus, and respectively send this information to the stereoscopic rendering unit 124, the blur rendering unit 126 and the caption adder unit 128.

The stereoscopic rendering unit 124 can receive the information of the range of depth values $R_Z$ associated with the object of focus identified from the saliency map, and modify and convert the depth map D0 into an adjusted depth map D1 in which the range of depth values associated with the object of focus can be remapped toward a depth level of a display screen in the display unit 106. Based on the modified depth map D1 and the 2D image frame I, the stereoscopic rendering unit 124 can generate one or more virtual stereoscopic image frame. By remapping the object of focus closer to the depth level of the display screen, the decoupling between accommodation and vergence can be reduced to provide more comfortable depth perception.

The blur rendering unit 126 can operate to add blurring effects to the stereoscopic image frames outputted by the stereoscopic rendering unit 124. In particular, certain regions of the stereoscopic image frames other than the object of focus may be blurred so as to enhance depth perception by the viewer. In some embodiments, the regions to blur may be determined based on the saliency map and related information provided by the saliency detector 122. However, the blur rendering unit 126 may be omitted in other embodiments.

The caption/subtitle adder unit 128 can insert caption and/or subtitle texts to the stereoscopic image frames. In some embodiments, a fixed depth level can be associated with the caption and/or subtitle texts, which can correspond to the depth level of the display screen.

Figure 2:
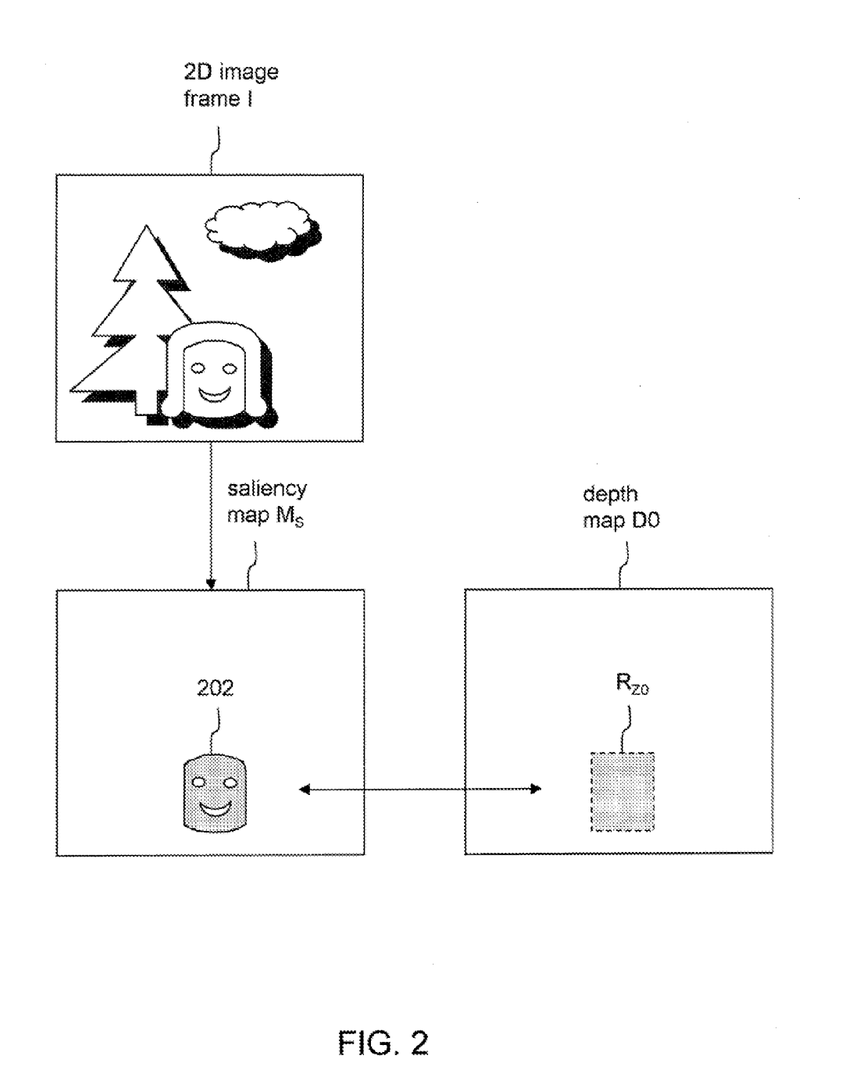
FIG. 2 is a simplified diagram illustrating the identification of an object of focus from a saliency map.

FIG. 2 is a simplified diagram illustrating the identification of an object of focus from a saliency map $M_S$. The object of focus can encompass any limited areas of an image frame that may be of interest to a viewer and on which focus can be realized. In one embodiment, skin detection can be applied by the saliency detector 122 to generate a saliency map $M_S$ from the 2D image frame I to identify pixel regions representing a human subject, in particular a subject's face. For example, suppose that the 2D image frame I includes pixel color data in the RGB (red, green and blue) color space, the RGB color data can be converted into the HSV (hue, saturation and value) color space according to currently known formulae. Once the H and S values are found for each pixel, they can be compared against skin color thresholds to determine whether pixels are skin color pixels. In this manner, an object of focus 202, e.g., a subject's face, can be identified from the saliency map $M_S$. It will be understood that the saliency detector 122 may be configured to identify other types of features that may be subjected to a viewer's focus including, without limitation, caption, subtitle texts and the like. The different types of salient features can be determined by analyzing and comparing the pixel color data from the 2D image frame I. Based on the saliency map $M_S$, a range of depth values $R_{Z0}$ associated with the object of focus 202 can then be identified from the depth map D0.

Figure 3:
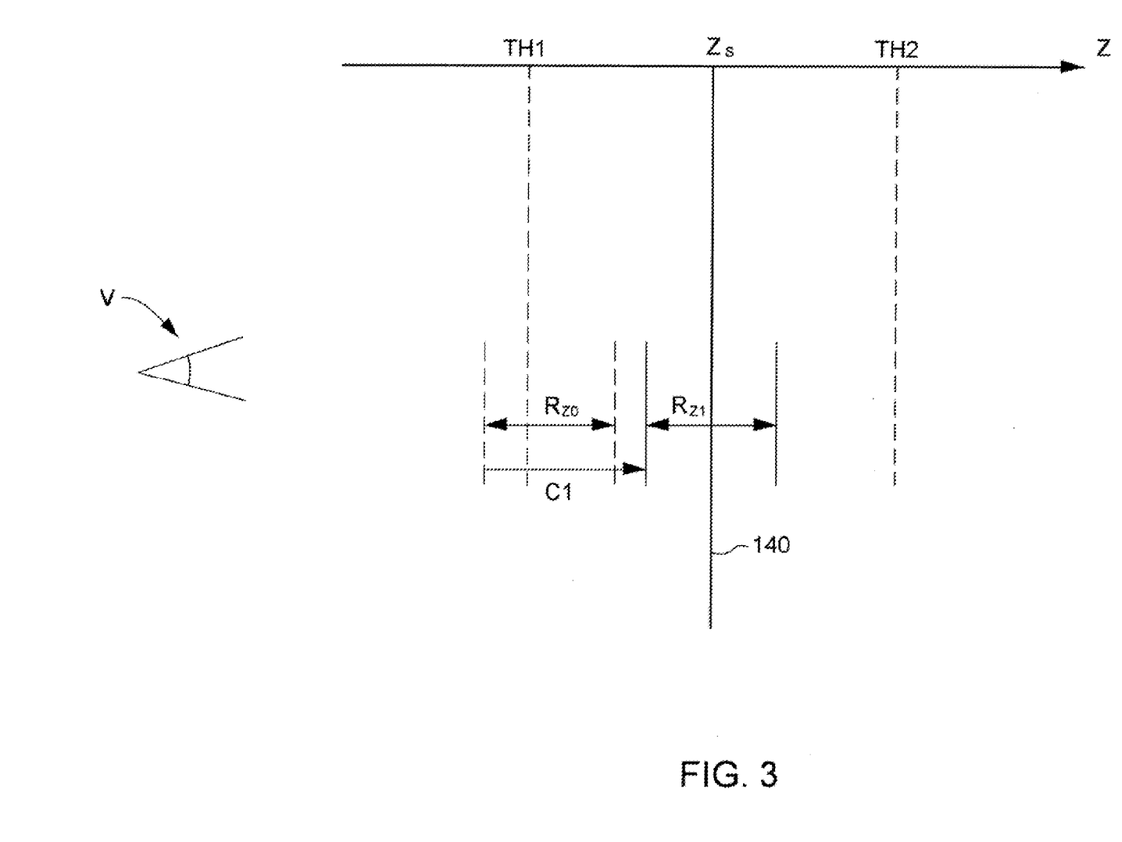
FIG. 3 is a schematic diagram illustrating a first embodiment for modifying an initial depth map to remap the depth of the identified object of focus toward a display screen.

FIG. 3 is a schematic diagram illustrating a first embodiment for modifying the depth map D0 to redistribute the depth of the identified object of focus 202. The representation of FIG. 3 is taken in a plane perpendicular to the plane of a display screen 140 of the display unit 106. The depth dimension can be exemplary represented along a horizontal axis Z perpendicular to the plane of the display screen 140. In one embodiment, the depth map D0 can be converted into an adjusted depth map D1 by offsetting/shifting the range of depth values $R_{Z0}$ associated with the object of focus 202 toward a depth level $Z_S$ of the display screen 140. Suppose that $Z_i'$ is a depth value in the adjusted range of depth values $R_{Z1}$ in the depth map D1, and $Z_i$ is a depth value in the range of depth values $R_{Z0}$ in the depth map D0, the relationship between $Z_i'$ and $Z_i$ can be according to the following formulae:

$$Z_i' = Z_i + C1 \quad (1),$$

wherein the constant value C1 defines the offset of the range of depth values $R_{Z0}$ toward the depth level $Z_S$ of the display screen 140. In one embodiment, the range of depth values $R_{Z1}$ that is associated with the object of focus 202 in the adjusted depth map D1 can be substantially centered about the depth level $Z_S$ of the display screen 140. When virtual stereoscopic images are generated based on the 2D image frame I and the adjusted depth map D1 and presented to a viewer V, the depth at which the object of focus 202 is perceived can be in proximity to the actual focal distance to the display screen 140. As a result, eye fatigue due to accommodation-vergence conflict can be reduced.

In remapping the object of focus 202 toward the display screen 140, the aforementioned offset may be applied selectively on the range of depth value $R_{Z0}$ while leaving remaining pixel areas of the depth map DO unchanged (i.e., only the range of depth values $R_{Z1}$ in the adjusted depth map D1 differs from the range of depth values $R_{Z0}$ in the initial depth map D0), or on all depth values in the initial depth map D0 (i.e., all the depth values are offset by the constant value C1 in a direction to have the range of depth values $R_{Z1}$ substantially centered about the depth level $Z_S$ of the display screen 140).

In some embodiments, the range of depth values $R_{Z0}$ may also be compared against threshold values TH1 and TH2 before remapping the object of focus 202. If the range of depth values $R_{Z0}$ is within the range delimited by the threshold values TH1 and TH2, no redistribution is made, and virtual stereoscopic image frames can be constructed based on the 2D image frame I and the depth map D0. If the range of depth values $R_{Z0}$ is located outside the range delimited by the threshold values TH1 and TH2, the depth map D0 can be converted into the adjusted depth map D1 in which the range of depth values $R_{Z1}$ is between two threshold values TH1 and TH2 (i.e., $R_{Z1} \leq |TH1-TH2|$), whereby the object of focus 202 can be redistributed toward the display screen 140.

Figure 4:
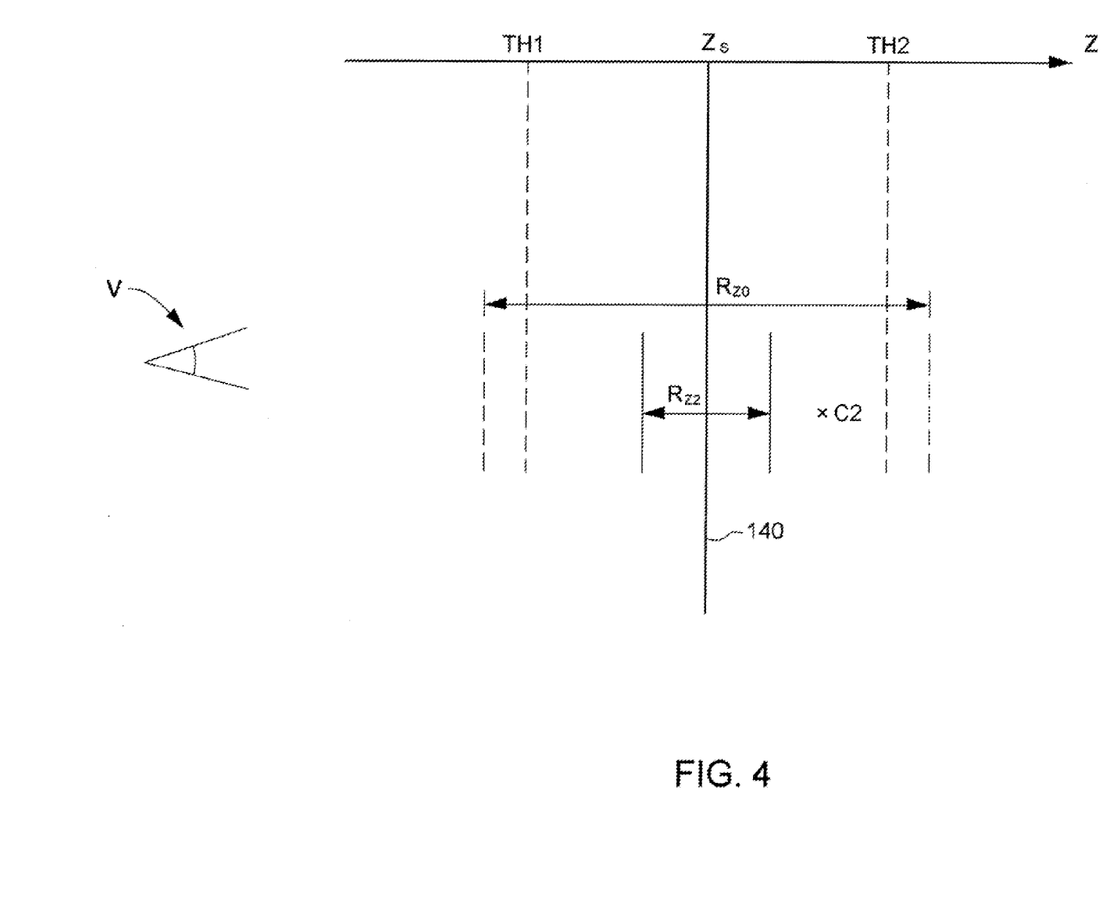
FIG. 4 is a schematic diagram illustrating a second embodiment for modifying an initial depth map to remap the depth of the identified object of focus toward a display screen.

FIG. 4 is a schematic diagram illustrating a second embodiment for modifying the depth map D0 to redistribute the depth values associated with the identified object of focus 202. The depth map D0 can be converted into a depth map D2 by compressing all of the depth values contained in the depth map D0 toward the depth level $Z_S$ of the display screen 140. For example, suppose that the range of depth values $R_{Z0}$ in the initial depth map D0 is approximately centered about the depth level $Z_S$ of the display screen 140. The adjusted depth map D2 may be obtained by applying a compression operator on the initial depth map D0 such that the range of depth values $R_{Z0}$ can be shrunk into the range of depth values $R_{Z1}$ substantially centered about the display screen 140. In one embodiment, suppose that $Z_i'$ is a depth value in the range of depth values $R_{Z2}$ in the depth map D2, and $Z_i$ is a depth value in the range of depth values $R_{Z0}$ of the depth map D0, the relationship between $Z_i'$ and $Z_i$ can be according to the following formulae:

$$Z_i' = C2 \times Z_i + C3 \quad (2)$$

wherein C2 is a compression coefficient smaller than 1, and C3 is a constant value that can be derived from the depth level $Z_S$ of the display screen 140 and the compression coefficient C2. In one embodiment, the constant C3 can be derived as $C3 = Z_S \times (1-C2)$. It is understood that while the foregoing provides an example of computation for the compression operator, different computation formulae may also be applied to compress the range of depth values $R_{Z0}$.

When virtual stereoscopic images are generated based on the 2D image frame I and the adjusted depth map D2, the depth of the object of focus 202 can be set in proximity to the display screen 140 to render stereoscopic perception more comfortable.

In remapping the object of focus 202 toward the display screen 140, the aforementioned compression operation may be applied selectively on the range of depth value $R_{Z0}$ while leaving remaining pixel areas of the depth map D0 unchanged (i.e., only the compressed range of depth values $R_{Z2}$ in the adjusted depth map D2 differs from the range of depth values $R_{Z0}$) in the initial depth map D0), or on all depth values in the initial depth map D0.

In some embodiments, the range of depth values $R_{Z0}$ may also be compared against threshold values TH1 and TH2 before remapping the object of focus 202. If the range of depth values $R_{Z0}$ is within the range delimited by the threshold values TH1 and TH2, no redistribution is made, and virtual stereoscopic image frames can be constructed based on the 2D image frame I and the initial depth map D0. If the range of depth values $R_{Z0}$ is greater than the range delimited by the threshold values TH1 and TH2, the depth map D0 can be converted into the adjusted depth map D2 in which the compressed range of depth values $R_{Z2}$ is between two threshold values TH1 and TH2 (i.e., $R_{Z2} \leq |TH1-TH2|$), whereby the depth of the object of focus 202 can be remapped toward the display screen 140.

Figure 5:
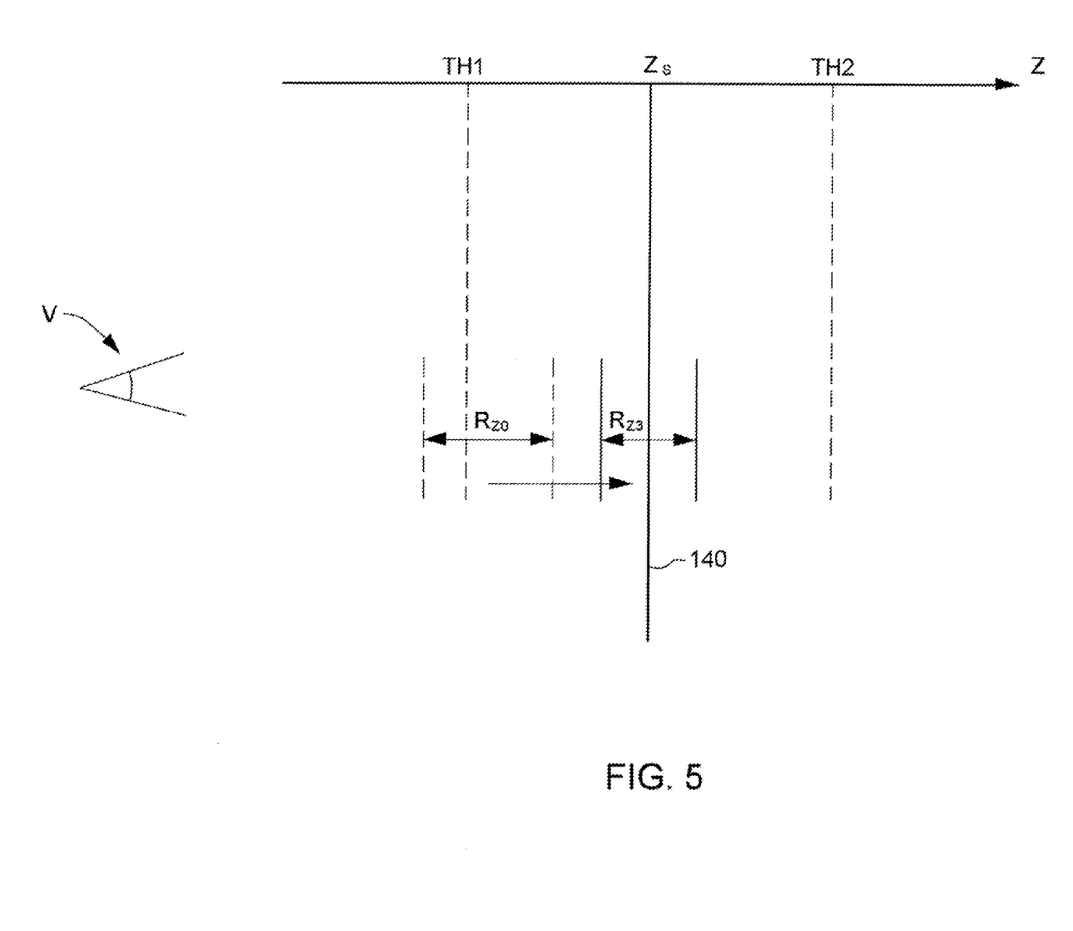
FIG. 5 is a schematic diagram illustrating a third embodiment for modifying an initial depth map to remap the depth of the identified object of focus toward a display screen.

FIG. 5 is a schematic view illustrating a third embodiment for modifying the depth map D0 to redistribute the depth values associated with the identified object of focus 202. The third embodiment can combine the embodiments shown in FIGS. 3 and 4 to redistribute the range of values associated with the object of focus 202 toward the depth level of the display screen 140. Accordingly, the initial depth map D0 can be offset and shrunk to derive the adjusted depth map D3 in which the range of depth values $R_{Z3}$ is centered about the depth level $Z_S$ of the display screen 140 and shrunk compared to the range of depth values $R_{Z0}$. Like previously described, the aforementioned offset/compression operations may be applied selectively on the range of depth value $R_{Z0}$ while leaving remaining pixel areas of the depth map D0 unchanged (i.e., only the range of depth values $R_{Z3}$ in the adjusted depth map D3 differs from the range of depth values $R_{Z0}$ in the initial depth map D0), or on all depth values in the initial depth map D0.

In some embodiments, the range of depth values $R_{Z0}$ may also be compared against threshold values TH1 and TH2 before remapping the object of focus 202. If the range of depth values $R_{Z0}$ is within the range delimited by the threshold values TH1 and TH2, no redistribution is made, and virtual stereoscopic image frames can be constructed based on the 2D image frame I and the depth map D0. If the range of depth values $R_{Z0}$ is located outside and/or greater than the range delimited by the threshold values TH1 and TH2, the depth map D0 can be converted into the adjusted depth map D3 in which the range of depth values $R_{Z3}$ is centered about the depth level $Z_S$ of the display screen 140 and between two threshold values TH1 and TH2 (i.e., $R_{Z3} \leq TH1-TH2|$).

Figure 6:
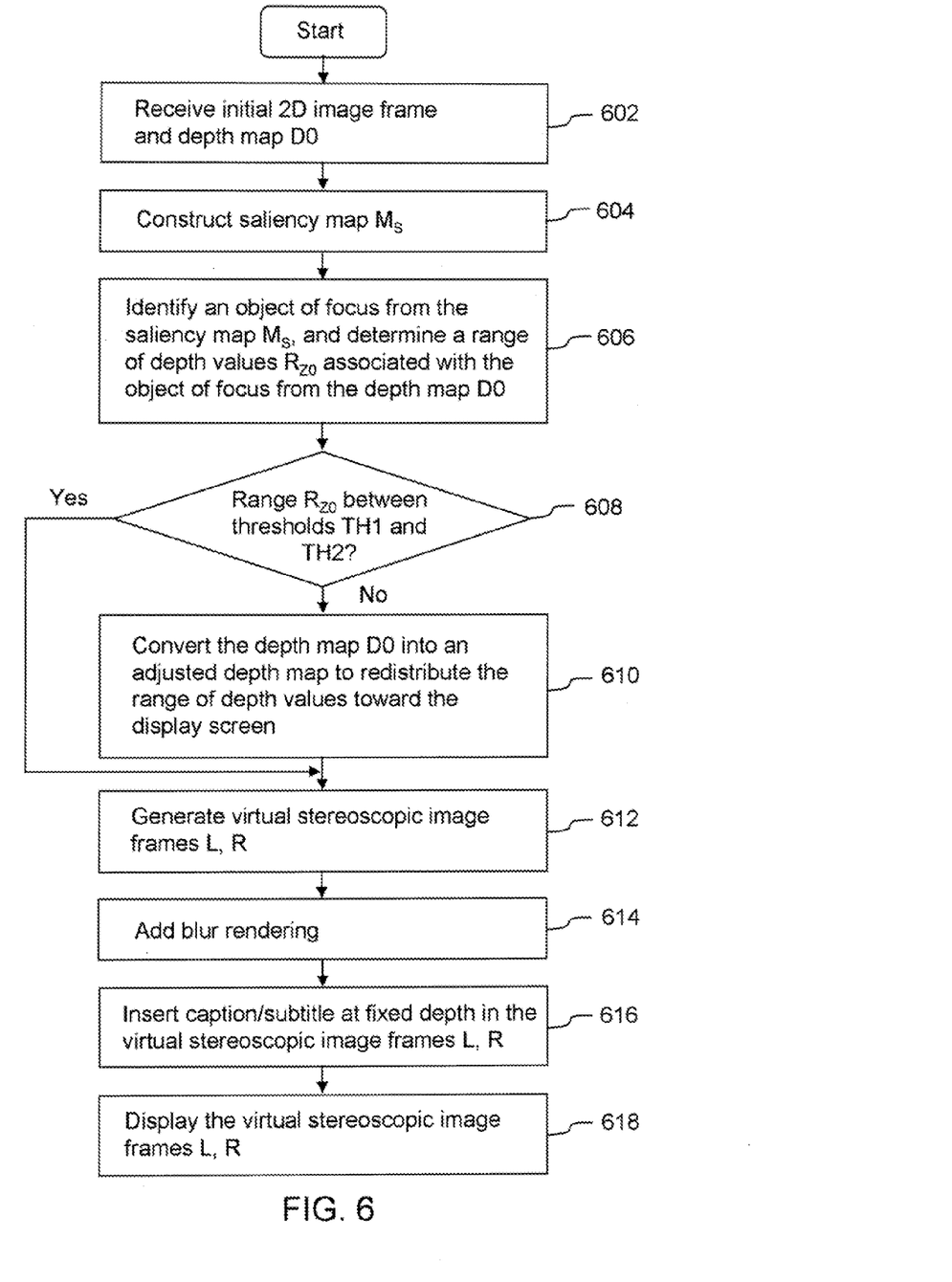
FIG. 6 is a flowchart of method steps for rendering stereoscopic images.

FIG. 6 is a flowchart of exemplary method steps for rendering stereoscopic images. In step 602, the 2D image frame I and the initial depth map D0 can be received by the 3D rendering processor 102. In step 604, a saliency map $M_S$ can be constructed based on the 2D image frame I. In one embodiment, the saliency map $M_S$ can be generated by applying skin color detection in the 2D image frame I so as to identify a human face as the object of focus 202. In alternate embodiments, other colors of interest may also be detected to identify a different object of focus. After the saliency map $M_S$ is constructed and the object of focus 202 identified, step 606 can be performed to identify an object of focus 202 to a viewer, and locate a range of depth values $R_{Z0}$ in the depth map D0 that is associated with the object of focus 202.

In step 608, the range of depth values $R_{Z0}$ can be compared against depth threshold values TH1 and TH2 to determine whether depth remapping of the object of focus 202 toward the display screen 140 is needed.

When the range of depth values $R_{Z0}$ extends beyond the threshold values TH1 and/or TH2, the depth map D0 in step 610 can be converted into an adjusted depth map to redistribute the range of depth values $R_{Z0}$ associated with the object of focus 202 toward the display screen 140 of the display unit 106, so that the adjusted range of depth values associated with the object of focus 202 can be within the range defined between the threshold values TH1 and TH2. Any of the depth remapping methods described previously with reference to FIGS. 3 through 5 may be applied to generate the adjusted depth map D1, D2 or D3. In step 612, one or more virtual stereoscopic image frames L, R then can be constructed based on the initial 2D image frame I and the adjusted depth map.

When the range of depth values $R_{Z0}$ is within the range delimited between the threshold values TH1 and TH2, no depth remapping of the object of focus 202 is required. Accordingly, step 610 can be skipped, and step 612 can be performed to generate one or more virtual stereoscopic image frames L, R based on the initial 2D image frame I and depth map D0.

In step 614, blur rendering may be applied on the stereoscopic image frames L, R. For example, regions other than the pixel area of the object of focus 202 may be blurred for enhancing depth perception of the object of focus 202.

In step 616, caption, subtitle or related text information can be inserted into the stereoscopic image frames L, R. In one embodiment, the caption, subtitle or related text information can be anchored at fixed positions in the stereoscopic image frames L, R such that they can be perceived by the viewer substantially at the depth level of the display screen 140 and/or corresponding to the object of focus 202. In this manner, accommodation-vergence decoupling can be reduced for more comfortable viewing experience. In step 618, the virtual stereoscopic image frames L, R then can be presented on the display screen 140 of the display unit 106.

Figure 7:
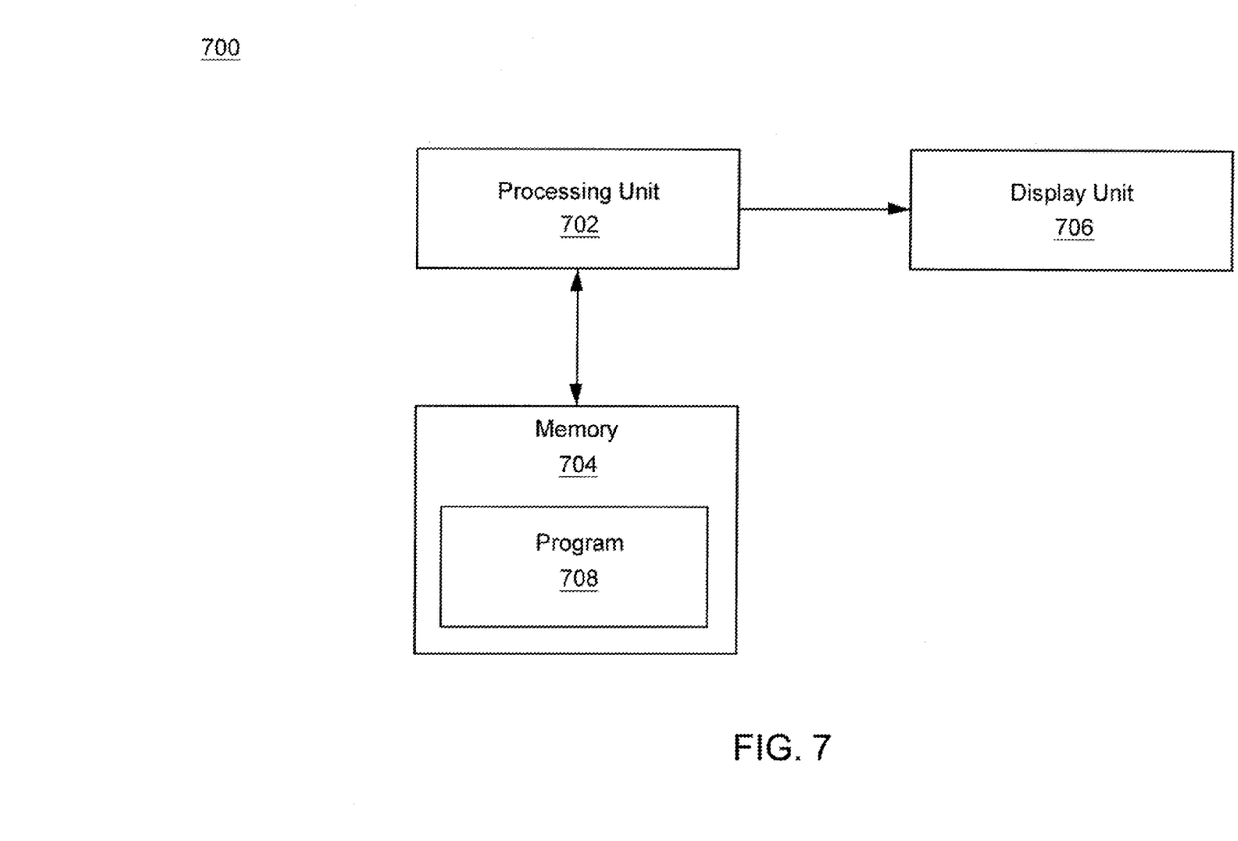
FIG. 7 is a schematic view illustrating an embodiment of a computing device adapted to render stereoscopic images.

The features and embodiments described herein can be implemented in any suitable form including hardware, software, firmware or any combination thereof. FIG. 7 is a schematic view illustrating an implementation of a computing device 700 that includes a processing unit 702, a memory 704 coupled with the processing unit 702, and a display unit 706. The aforementioned method steps may be implemented at least partly as a computer program 708 stored in the memory 704. The processing unit 702 can execute the computer program 708 to render stereoscopic image frames on a display unit 706 as described previously.

At least one advantage of the systems and methods described herein is the ability to detect and remap an object of focus toward the display screen so as to reduce the decoupling between accommodation and vergence. Accordingly, more comfortable viewing experience can be provided.

While the embodiments described herein depict different functional units and processors, it is understood that they are provided for illustrative purpose only. The different elements, components and functionality between different functional units or processors may be may be physically, functionally and logically implemented in any suitable way. For example, functionality illustrated to be performed by separate processors or controllers may also be performed by a single processor or controller.

Realizations in accordance with the present invention therefore have been described in the context of particular embodiments. These embodiments are meant to be illustrative and not limiting. Many variations, modifications, additions, and improvements are possible. Accordingly, plural instances may be provided for components described herein as a single instance. Structures and functionality presented as discrete components in the exemplary configurations may be implemented as a combined structure or component. These and other variations, modifications, additions, and improvements may fall within the scope of the invention as defined in the claims that follow.

What is claimed is:

1. A method applicable on a processing unit to form a stereoscopic image based on a two-dimensional image frame and a depth map associated therewith, the method comprising:
   generating a saliency map of the two-dimensional image frame;
   determining a region where is located an object of focus from the saliency map;
   modifying the depth map such that a range of depth values in the depth map that is associated with the object of focus is redistributed substantially centered about a depth level of a display screen; and
   generating a virtual stereoscopic image frame based on the modified depth map and the two-dimensional image frame.

2. The method according to claim 1, wherein the step of generating a saliency map comprises:
   applying skin detection on the two-dimensional image frame.

3. The method according to claim 2, wherein the object of focus includes a human face.

4. The method according to claim 1, wherein the step of modifying the depth map includes selectively offsetting the range of depth values associated with the object of focus by a constant value toward the depth level of the display screen.

5. The method according to claim 4, wherein the step of selectively offsetting the range of depth values displaces the range of depth values to a position substantially centered about the depth level of the display screen.

6. The method according to claim 1, wherein the step of modifying the depth map includes offsetting all depth values in the depth map by a constant value so that the range of depth values associated with the object of focus is displaced to a position substantially centered about the depth level of the display screen.

7. The method according to claim 1, wherein the step of modifying the depth map includes compressing the range of depth values associated with the object of focus about the depth level of the display screen.

8. The method according to claim 1, further including inserting a subtitle or a caption into the virtual stereoscopic image frame at an anchored position corresponding to the depth level of the display screen.

9. A stereoscopic rendering system comprising:
   a memory; and
   a processing unit coupled with the memory, the processing unit being configured to:
      generate a saliency map of the two-dimensional image frame;
      determine a region where is located an object of focus from the saliency map;
      modify the depth map such that a range of depth values in the depth map that is associated with the object of focus is redistributed substantially centered about a depth level of a display screen; and
      generate a virtual stereoscopic image frame based on the modified depth map and the two-dimensional image frame.

10. The system according to claim 9, wherein the processing unit is configured to generate the saliency map by applying skin detection on the two-dimensional image frame.

11. The system according to claim 10, wherein the object of focus includes a human face.

12. The system according to claim 9, wherein the processing unit is configured to modify the depth map by selectively offsetting the range of depth values associated with the object of focus by a constant value toward the depth level of the display screen.

13. The system according to claim 12, wherein selectively offsetting the range of depth values displaces the range of depth values to a position substantially centered about the depth level of the display screen.

14. The system according to claim 9, wherein the processing unit is configured to modify the depth map by offsetting all depth values in the depth map by a constant value so that the range of depth values associated with the object of focus is displaced to a position substantially centered about the depth level of the display screen.

15. The system according to claim 9, wherein the processing unit is configured to modify the depth map by compressing the range of depth values associated with the object of focus about the depth level of the display screen.

16. The system according to claim 9, wherein the processing unit is further configured to:
   insert a subtitle or a caption into the virtual stereoscopic image frame at an anchored position corresponding to the depth level of the display screen.

17. A non-transitory computer readable medium storing a sequence of computer program instructions which, when executed by a processing unit, causes the processing unit to:
   generate a saliency map of the two-dimensional image frame;
   determine a region where is located an object of focus from the saliency map;
   modify the depth map such that a range of depth values in the depth map that is associated with the object of focus is redistributed substantially centered about a depth level of a display screen; and
   generate a virtual stereoscopic image frame based on the modified depth map and the two-dimensional image frame.

18. The computer readable medium according to claim 17, further storing a sequence of computer program instructions that cause the processing unit to:

detect skin color in the two-dimensional image frame to generate the saliency map.

19. The computer readable medium according to claim 17, further storing a sequence of computer program instructions that cause the processing unit to modify the depth map by offsetting the range of depth values associated with the object of focus by a constant value toward the depth level of the display screen, and compressing the range of depth values.

\* \* \* \* \*